(No Model.) 3 Sheets—Sheet 1.

A. P. SMITH.
APPARATUS FOR TAPPING MAINS.

No. 505,963. Patented Oct. 3, 1893.

WITNESSES: Oscar A. Michel. E. L. Sherman.

INVENTOR: Anthony P. Smith, BY Drake & Co. ATTY'S.

(No Model.) 3 Sheets—Sheet 2.

A. P. SMITH.
APPARATUS FOR TAPPING MAINS.

No. 505,963. Patented Oct. 3, 1893.

Fig. 2ª

WITNESSES: INVENTOR:

Oscar A. Michel
E. L. Sherman

Anthony P. Smith,
BY Drake & Co, ATTY'S.

(No Model.) 3 Sheets—Sheet 3.

A. P. SMITH.
APPARATUS FOR TAPPING MAINS.

No. 505,963. Patented Oct. 3, 1893.

WITNESSES: INVENTOR:
Oscar A. Michel. Anthony P. Smith
E. L. Sherman BY Drake & Co. ATTY'S.

UNITED STATES PATENT OFFICE.

ANTHONY P. SMITH, OF NEWARK, NEW JERSEY.

APPARATUS FOR TAPPING MAINS.

SPECIFICATION forming part of Letters Patent No. 505,963, dated October 3, 1893.

Application filed April 9, 1890. Serial No. 347,170. (No model.) Patented in England May 2, 1890, No. 6,810, and in Canada October 21, 1892, No. 40,770.

*To all whom it may concern:*

Be it known that I, ANTHONY P. SMITH, a citizen of the United States, residing at Newark, in the county of Essex and State of New Jersey, have invented certain new and useful Improvements in Apparatus for Tapping Mains, (for which I have obtained a British patent, No. 6,810, dated May 2, 1890, and Canadian patent, No. 40,770, dated October 21, 1892;) and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to certain improvements for tapping and making branch connections in water and other main pipes, and is more particularly an improvement on the apparatus shown and described by me in Letters Patent of the United States granted to me January 15, 1889, No. 396,177, and January 21, 1890, No. 419,974.

The object of the present improvements is to secure greater efficiency in machines of the class referred to, to secure increased convenience, to render the machine more durable, and to obtain other advantages and results some of which will be referred to more particularly in connection with the description of the working parts.

The invention consists in the arrangements and combinations of parts all substantially as will be hereinafter set forth and finally embodied in the clauses of the claim.

Figure 1:
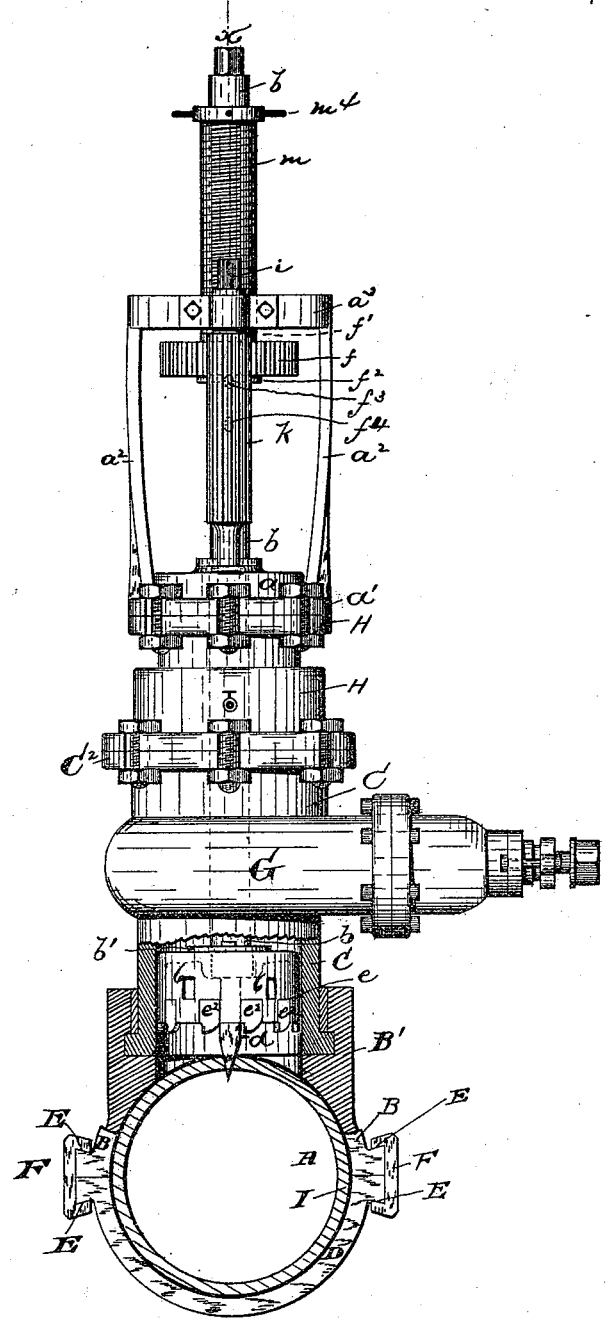
Figure 2:
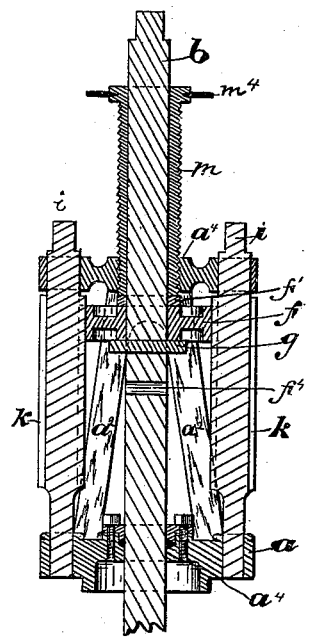
Figure 2:
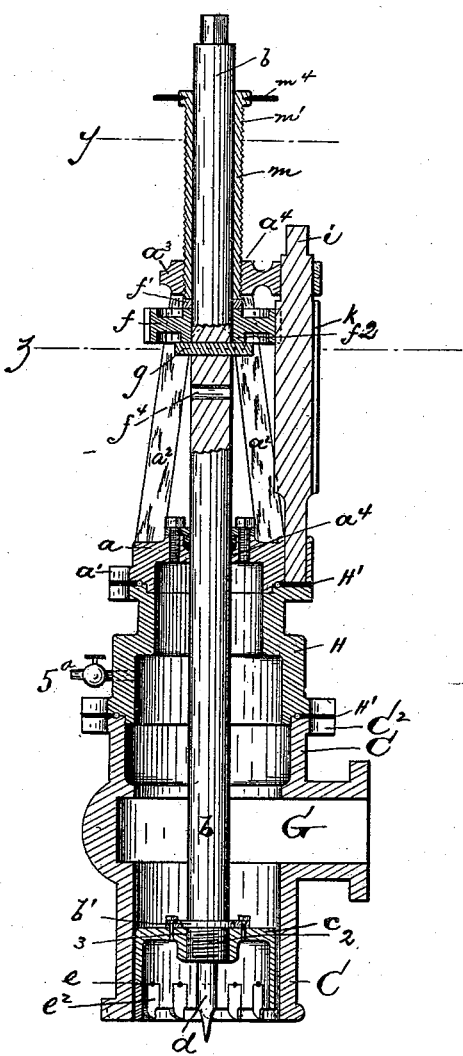
Figure 3:
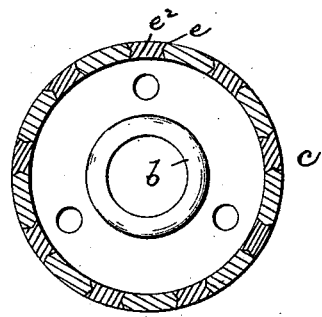
Figure 4:
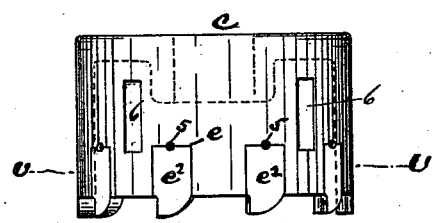
Figure 5:
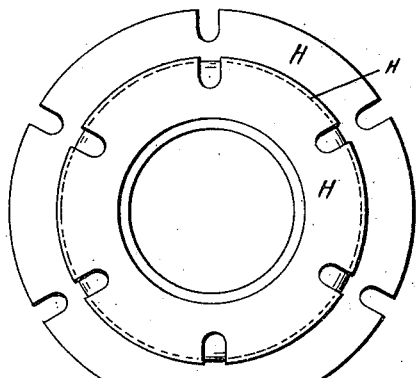
Figure 6:
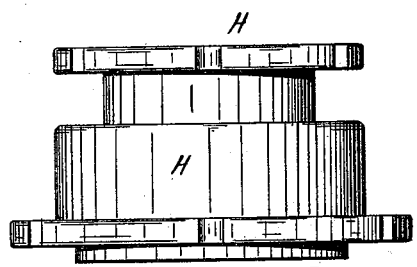
Figure 7:
Figure 11:
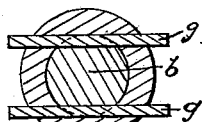
Figure 9:
Figure 8:
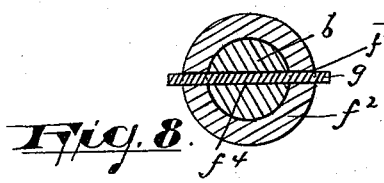
Figure 10:

Referring to the accompanying drawings in which like letters and numerals indicate corresponding parts in each of the several views, Figure 1 is a front elevation of my improved drilling and tapping apparatus, partly in section. Fig. 2 is a vertical section of the drilling and tapping mechanisms taken on line $x$, Fig. 1. Fig. 2$^a$, is a detail view showing the tapping mechanism as provided with two pinions. Fig. 3 is an enlarged view of a cutter cylinder and its teeth, in section, the section line being at $x$, Fig. 4. Fig. 4 is an elevation of the cutter cylinder and inserted teeth and showing openings for removing the teeth. Fig. 5 is an end view and Fig. 6 a side view of a certain intermediate coupling pipe or connection in detail. Fig. 7 is a sectional view on line $y$, of Fig. 2. Fig. 8 is a section on line $z$, Fig. 2. Fig. 9 is an enlarged detail of a disk-cutting tooth to be inserted in the cylinder. Fig. 10 is a section on line $w$, Fig. 9, and Fig. 11 is a section showing a modification of construction in which two pins or wedges are employed in lieu of one.

In said drawings, A represents a main water or gas pipe to be tapped to admit of a flow into a branch connection. B indicates the upper section of a sleeve secured upon said pipe or main and provided with a hub, B′, within which is secured a branch pipe section C. D is the lower or co-operating section of the sleeve on said main and F are locking clamps for holding the two projections of the sleeve firmly together as shown in Fig. 1. They may be held together by any other desirable means.

G is an ordinary valve or gate receptacle made integral with the branch pipe, C, in which an ordinary valve or gate is arranged to operate as described in my prior patents referred to.

I indicates packing inserted between the sectional sleeve and the main.

On the branch pipe, C, is formed a flange, $C^2$, to which is secured the tapping apparatus when the base of the latter corresponds in size with said flange. Should one of said parts, however, be larger than the other, as in the case illustrated in the drawings, I insert, between the two, a separate and independent coupling pipe or connection, H, shown in Figs. 1, 2, 5 and 6, one end of which is made to correspond in size with said flange and the other with said base. By means of such separate and independent coupling connection, I am enabled to use the same tapping apparatus in connection with branch pipes of different sizes with facility and economy. The parts may be secured by bolts as shown, or other appropriate means.

In the tapping mechanisms, $a$ represents the lower part of a frame or holding support with a base flange, $a'$, for securing it, by bolts or otherwise to branch pipe, C, or its intermediate coupling connection, H. From this lower portion extend vertical supports, $a^2$, holding the top, $a^3$, of the frame, the parts $a$, $a'$, $a^2$, being made integral, by preference, and the parts $a$, $a^3$, being threaded as will be hereinafter set forth.

Within the hole, $a^4$, is fitted and adjusted a cutter shaft, $b$, to which is secured the cutter, $c$, and central drill $d$. The central drill is secured in axial line with the shaft, the latter being socketed to receive said drill in the ordinary manner and provided with screw threads to receive the cutter, $c$; said cutter may be secured to the shaft against turning by any suitable means. The cutter consists of a hollow cylindrical body portion, having at one end a head, integral, by preference, with the cylindrical portion and centrally perforated and threaded to enable said head to be screwed upon the cutter shaft. The lower, or opposite, edge of the cylinder is notched or socketed, as at $e$, Figs. 3 and 4, and into the sockets are driven metal-cutting teeth, $e$, formed and adapted to cut the cast-iron and cylindrical or curved sides of the water or gas main. These teeth are independent of and removable from the cylinder, are tapered sharply back at the lower edge so as to give clearance to said teeth and reduce friction as will be understood upon reference to Fig. 9. Said teeth are all equidistant from the central drill and the said drill serves as a center support or stay thereto preventing any lateral disarrangement caused by the action of the teeth on a curved surface. The sockets for said teeth are formed with tongued or grooved walls, preferably V-shaped as shown in Fig. 3, and the teeth are correspondingly shaped and held in place by frictional contact. The center drill projects beyond the plane of the series of teeth and first enters and perforates the pipe and allows an outflow of water, and this serves to keep the teeth cool and hard under the severe strain thereon and also hold the cutter and shaft steadily in place so that the teeth remain constantly in a given path, and this tends to relieve the teeth of lateral strain in their sockets by which they would be in danger of working loose and dropping from place. Above the cutting teeth are formed slots or recesses, 5, admitting the insertion of a lever or punching tool for drawing or driving out the tooth when broken or requiring sharpening.

In the cylinder are also holes or openings 6, 6, shown in Figs. 1 and 4. These serve as escapes or clearances for the cuttings.

On the cutter shaft, $b$, and within the supporting frame is adjustably secured a gear-wheel $f$, adapted to be arranged on said shaft at more than one point in its length. Above it is a loose collar, $f'$. On the under side of said gear wheel, is formed a hub, $f^2$, which is slotted on the edge as shown at $f^3$, Fig. 8. The slotted or notched hub is adapted to rest on a pin or wedge, $g$, driven through one of a plurality of slots, grooves or openings, $f^4$, in the shaft and lying in the said slots or notches in the hub. By this arrangement the gear wheel may be readily raised from engagement with the pin or wedge by which it is keyed upon the shaft, and the wedge or pin removed and inserted in another of the shaft openings, $f^4$, either above or below the one in which it is first placed. Thus should the main pipe be of a size beyond the limits of the feeding mechanisms, the relation of the gear wheel, $f$, and feed may be quickly and easily readjusted with relation to the shaft as will be understood.

In lieu of the single pin or wedge, $g$, shown in Fig. 8, I may use side wedges or pins such as are shown in Fig. 11.

Between the upper and lower portions of the supporting frame, and adapted to rotate in bearings therein, is arranged a shaft, $i$, carrying a pinion $k$, secured thereon or made integral therewith and meshing with the gear wheel $f$ as shown in Figs. 2 and $2^a$. These pinions should be made of sufficient length to allow the gear wheel and the shaft to advance as the cutting progresses as will be manifest.

Surrounding the shaft, $b$, at its upper end is an annular elongated sleeve, $m$, having its outer periphery threaded, as at $m'$, Fig. 2, so as to fit and turn in the threaded opening, $a^4$, in the upper part of the supporting frame and serve as a feed screw when drilling or cutting. This sleeve or feed screw is adapted and arranged to have its lower end rest against the top of the collar, $f'$, resting on the gear wheel, $f$, and is provided with operating arms or handles $m^4$, Figs. 1 and 2. The shaft, or shafts, $i$, is also provided with means to enable the same to be turned.

In carrying the invention into practice, after the sections of the sleeve for the main have been adjusted and firmly secured on said main by any desired means, the branch pipe, C, is properly secured to the hub, B', after having been thoroughly packed to make the joints water tight. The supporting frame of the drilling and disk-cutting mechanism is then rigidly secured to the flange on the branch pipe with a water tight packing interposed, or to the intermediate coupling connection, H, when the base of said frame is either too large or too small to engage the said branch pipe, the valve or gate in the valve chamber, G, being open to receive or admit the passage of the cutting and drilling tools. The said tools are then passed through the opening in the valve chamber until the drill and centering tool is brought into proper position on the main pipe. When a comparatively small tap is to be made, the gear wheel, $f$, is brought into proper relation with one pinion and firmly secured on the shaft by the pin or wedge $g$. The feed screw is then brought down until the lower end rests on the loose collar on top of the gear wheel, $f$, and a ratchet lever or any other desired means is applied to the top of the drill shaft, after which the drilling commences and the drill enters the main before the teeth inserted in the edge of the cylinder and projecting but a little below the same engage the cylindrically convex surface, so that the teeth are held in their annular path and firmly in their sockets without rocking therein. The cutting teeth then engage the cylinder, and the pinions are turned to secure the necessary power.

When the blow-off cock, 5ª, is opened, it allows the water in the branch connection to escape and forms a current, the force of which carries away chips and cuttings that may have collected around or inside the cutting cylinder, the said cock thus coacting with the clearance openings in the hollow cylinder. The said blow off cock, by its peculiar arrangement also shows whether or not the gate is closed tightly after the cutting mechanism has completed its work and before using the tapping mechanism. This blow-off cock is arranged in the intermediate coupling, or on other than the branch connection, in order to be removed from said branch and be used repeatedly and thus save the cost of cocks and fittings. It is placed at a point outside of the closed gate to indicate leakage, as above referred to. When the point of the drill has passed through the main pipe, the water that escapes at once passes up around the drill and any defect in packing or securing of any portion of the connections will at once be detected and can be remedied before any further cutting is done.

When a large or heavy tap or cut is made, two pinions are employed as shown in Fig. 2ª, and thus greater power can be applied to the cutting mechanism as will be manifest, the two, or plurality of, pinions enabling two or a plurality of men to operate with ease and facility in transmitting power to the cutting cylinder, independent of the operations in connection with the center shaft.

Having thus described the invention, what I claim as new is—

1. In a tapping apparatus for water, gas, or other mains, the combination with a branched sleeve, of a frame secured thereto, a shaft journaled therein, the upper end of said shaft being provided with means for rotating it and moving it longitudinally and the lower end provided with a central longitudinal socket, and the exterior provided with screw threads, a collar secured to the shaft above the screw threads, a cylindrical cutter head secured to the screw threaded portion of the shaft, the outer edge of which is provided with removable teeth, bolts through the collar and the top of the head and a drill removably secured within the socket in the end of the shaft, substantially as set forth.

2. In a tapping apparatus for water gas and other mains, the combination with a branched sleeve and a frame secured thereto, of a shaft journaled in said frame, the upper end of which is provided with means for rotating it and moving it longitudinally, of a drill and a cylindrical cutter head secured to the opposite end of the shaft, the side walls of which cylindrical head are provided with clearance openings and the lower edge is provided with removable teeth, substantially as set forth.

3. In a tapping apparatus, the cylinder and means for rotating it, the former being provided at its projecting edge with cutting teeth and at the sides with openings to admit the clearance of cuttings, in combination with a center drill, substantially as herein set forth.

4. In a tapping apparatus, the combination of the frame having central bearings for a shaft, a shaft, sleeve $m$, a gear wheel, shafts $i, i$, each journaled in the frame and provided with pinions which engage the gear wheel and with means independent one of the other to enable a plurality of men to operate independently in connection with said shafts $i, i$, in turning the pinions, a center drill and a disk cutter all arranged and combined substantially as set forth.

5. In a tapping apparatus, the combination of the frame, shaft $b$ having cutting tools, sleeve $m$, pinions, and gear wheel having a notched hub adapted to rest on a pin or key and be vertically removable therefrom, and said pin or key adjustably secured to the shaft, substantially as set forth.

6. In a tapping apparatus, the combination of the frame, shaft carrying disk-cutting tools and having a plurality of slots or openings arranged at different points in the length of said shaft, a pin, wedge or key arranged in one of said slots or openings, a gear wheel keyed on the shaft by said pin, pinions K having means for turning, and feed mechanism, all arranged and adapted to operate substantially as set forth.

7. The improved tapping apparatus, combining a shaft arranged in a frame with means for turning and feeding the same, a gated branch and a sectional sleeve, and a cylinder having at one end a head joining said cylinder to the shaft and at the other end having metal-cutting teeth and having at suitable points in said cylinder clearance openings, and a central drill projecting beyond the edge of said cylinder and perforating the pipe prior to the engagement of the cylinder teeth, substantially as set forth.

8. In a tapping apparatus for water, gas, and other mains, the combination, with a branched sleeve and a pipe section secured thereto, of a hollow cylindrical cutter within said pipe section, the walls of which are provided with clearance openings and one end with teeth, and means for rotating the cutter, substantially as set forth.

In testimony that I claim the foregoing I have hereunto set my hand this 24th day of March, 1890.

ANTHONY P. SMITH.

Witnesses:
 OSCAR A. MICHEL,
 E. L. SHERMAN.